(12) United States Patent
Means

(10) Patent No.: US 9,310,090 B2
(45) Date of Patent: Apr. 12, 2016

(54) HVAC SYSTEM WITH LOCATION DETERMINATION CAPABILITY

(71) Applicant: Trane International Inc., Piscataway, NJ (US)

(72) Inventor: Stuart Allen Means, Whitehouse, TX (US)

(73) Assignee: Trane International Inc., Piscataway, NJ (US)

( * ) Notice: Subject to any disclaimer, the term of this patent is extended or adjusted under 35 U.S.C. 154(b) by 0 days.

(21) Appl. No.: 14/601,977

(22) Filed: Jan. 21, 2015

(65) Prior Publication Data

US 2015/0219349 A1    Aug. 6, 2015

Related U.S. Application Data

(60) Provisional application No. 61/934,512, filed on Jan. 31, 2014.

(51) Int. Cl.
*F24F 11/00* (2006.01)
*G01S 19/14* (2010.01)
*G01S 19/46* (2010.01)

(52) U.S. Cl.
CPC .............. *F24F 11/001* (2013.01); *G01S 19/14* (2013.01); *F24F 2011/0068* (2013.01); *F24F 2011/0069* (2013.01)

(58) Field of Classification Search
CPC ....... F24F 11/001; G01C 21/20; G01S 19/46; G05D 15/00

USPC .............. 701/484; 705/305; 236/11, 51
See application file for complete search history.

(56) References Cited

U.S. PATENT DOCUMENTS

| | | | | |
|---|---|---|---|---|
| 5,818,347 A * | 10/1998 | Dolan | ........... | F24F 11/006 236/2 |
| 6,643,567 B2 * | 11/2003 | Kolk | ........... | G05F 23/1905 165/228 |
| 8,798,804 B2 * | 8/2014 | Besore | ........... | G06Q 30/0261 236/51 |
| 2010/0298986 A1 * | 11/2010 | Stachler | ........... | H01R 13/6456 700/276 |
| 2013/0060387 A1 * | 3/2013 | Imes | ........... | F24F 11/0086 700/278 |
| 2013/0166073 A1 * | 6/2013 | Pine | ........... | F24F 11/0034 700/276 |

* cited by examiner

*Primary Examiner* — Tan Q Nguyen
(74) *Attorney, Agent, or Firm* — Conley Rose, P.C.; J. Robert Brown, Jr.; Michael J. Schofield

(57) ABSTRACT

A heating, ventilation, and/or air conditioning (HVAC) system includes a system controller having a location determination module configured to cause determination and/or reporting of the location of the HVAC system in response to a first run and/or initialization of the HVAC system. The location determination module may determine and/or report location information via global positioning system (GPS) capability, a service provider (SP), customized data provider (CDP), Internet sites, LAN, WAN, 3G, 4G, and/or any other type of network infrastructure to effect reporting of the location of the HVAC system.

20 Claims, 3 Drawing Sheets

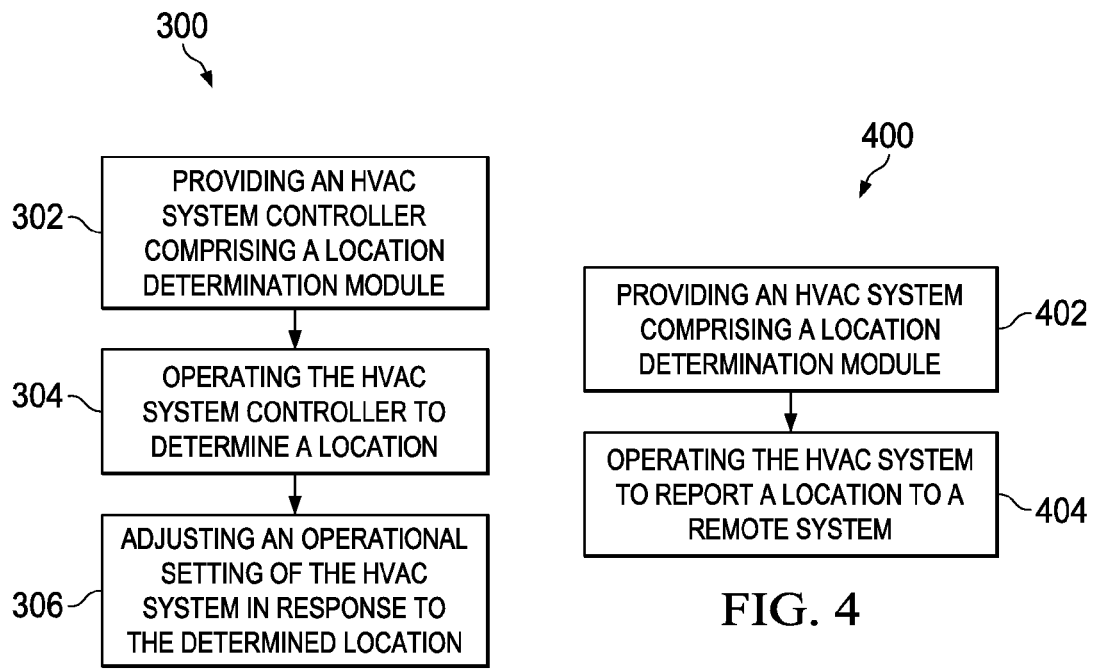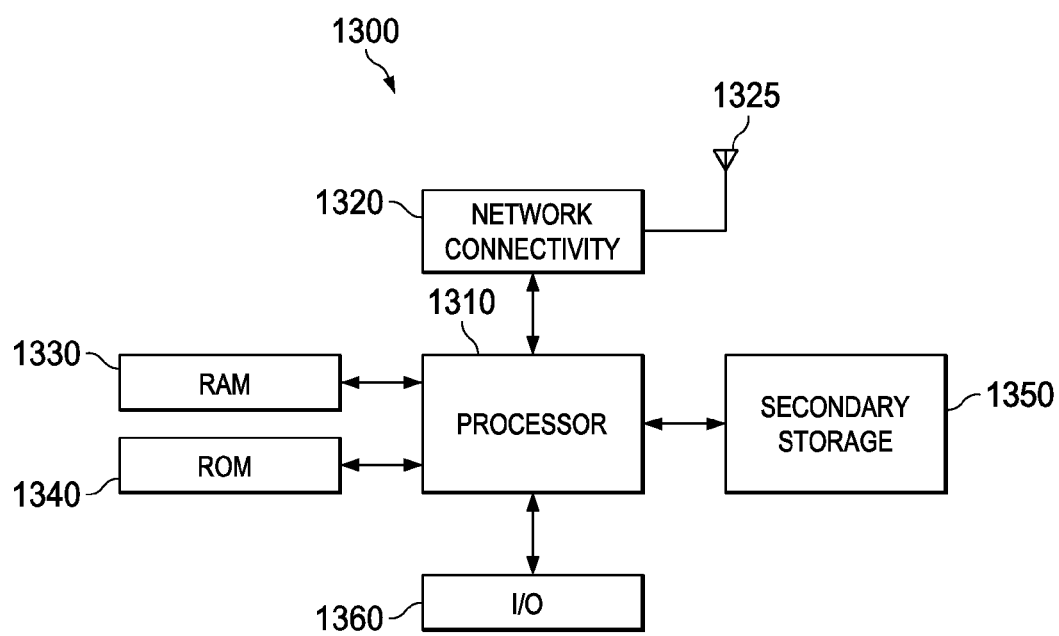

HVAC SYSTEM WITH LOCATION DETERMINATION CAPABILITY

CROSS-REFERENCE TO RELATED APPLICATIONS

The present application claims priority under 35 U.S.C. 119(e) to U.S. Provisional Patent Application No. 61/934,512 filed on Jan. 31, 2014 by Stuart Allen Means and entitled "HVAC System with Location Determination Capability," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems are installed in a wide variety of geographic locations. Various geographic locations may have a range of climates that the HVAC systems are exposed to.

SUMMARY

In some embodiments of the disclosure, a heating, ventilation, and/or air conditioning (HVAC) system is disclosed as comprising a location determination module configured to determine the location of the HVAC system.

In other embodiments of the disclosure, a method of operating an HVAC system is disclosed as comprising: providing an HVAC system comprising a location determination module; determining location information of the HVAC system; and communicating location information to a remote system.

BRIEF DESCRIPTION OF THE DRAWINGS

For a more complete understanding of the present disclosure and the advantages thereof, reference is now made to the following brief description, taken in connection with the accompanying drawings and detailed description:

FIG. 3 is a flowchart of a method of operating an HVAC system;

FIG. 4 is a flowchart of another method of operating an HVAC system; and

FIG. 5 is a simplified representation of a general-purpose processor (e.g. electronic controller or computer) system suitable for implementing the embodiments of the disclosure.

DETAILED DESCRIPTION

Figure 1:
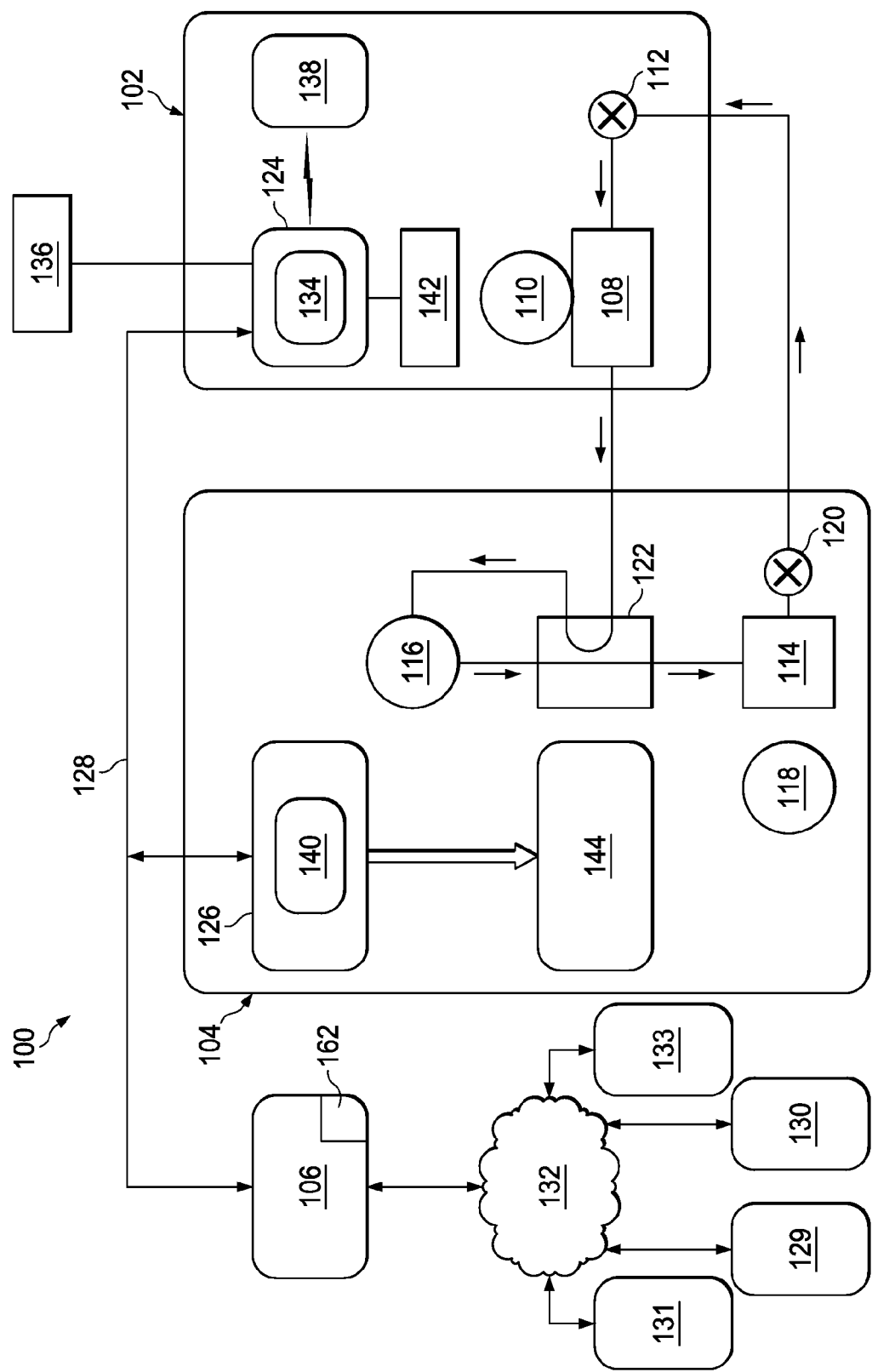
FIG. 1 is a schematic diagram of an HVAC system according to an embodiment of the disclosure.

Referring now to FIG. 1, a schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100. Additionally, in some embodiments, the system controller 106 may comprise a location determination module 162.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
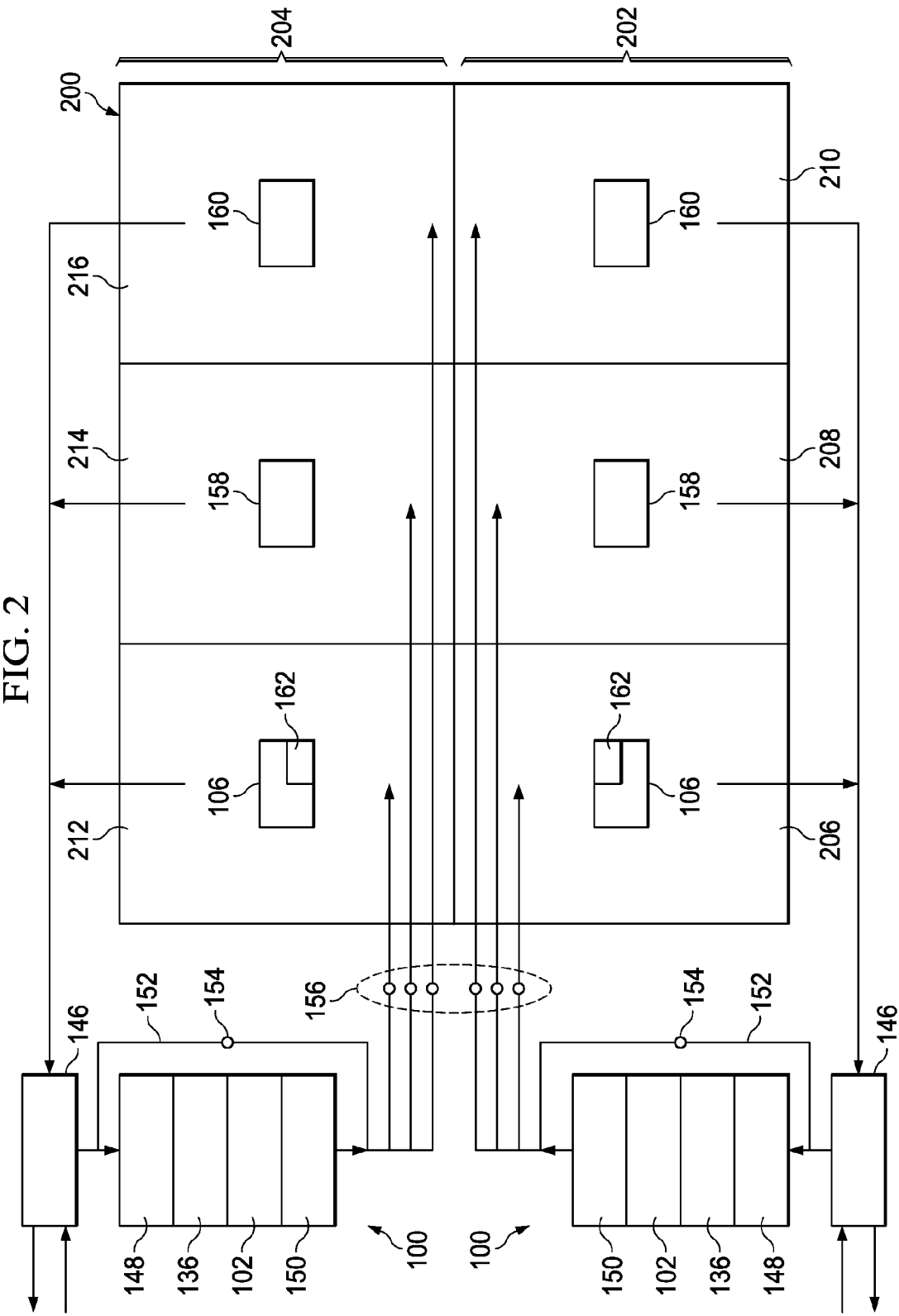
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

In this embodiment, at least one of the HVAC systems 100 comprises a location determination module 162. In this embodiment, the location determination module 162 may comprise a computer, software, and/or hardware configured to allow generation, transmittal, and/or to allow a request for generation and/or transmittal of a location of the HVAC system 100. In this embodiment, the location determination module 162 comprises a global positioning system (GPS) device configured to determine and/or report latitude and longitude coordinates of the HVAC system 100. In this embodiment, the location determination module 162 may be carried by at least one of the system controllers 106, zone thermostats 158, and zone sensors 160. In some embodiments, however, the location determination module 162 may be carried by an outside unit to ensure acceptable reception of signals from GPS satellites. In some cases, the HVAC system 100 may cause determination and/or reporting of the location of the HVAC system 100 in response to a first run and/or initialization of the HVAC system 100. The location determination module 162 may provide location information to other systems via the communication network 132. In this embodiment, the location determination module 162 may be configured to generate, transmit, and/or to allow a request for generation and/or transmittal of location information to alter a setting and/or an operation of the HVAC system 100. In some embodiments, the HVAC system may communicate with a security provider (SP) 133 which may take predetermined actions in response to receiving the location information. In some embodiments, the HVAC system 100 may communicate with a customized data provider (CDP) 131, such as home automation service provider authorized by the manufacturer of system controller 106, which may similarly take predetermined actions in response to receiving the location information and/or the request for the location information.

The CDP 131, the SP 133, and/or the HVAC system 100 may also be configured to communicate with each other and/or other devices 130, such as, telephones, smart phones, and/or personal computers. In some cases, the CDP 131 may be controlled and operated by any entity authorized to communicate with system controller 106. Authorization for access to system controller 106 may take the form of a password, encryption, and/or any other suitable authentication method. Optionally, authorization may be disabled using system controller 106. CDP 131 may be configured to allow for the setup of account login information to remotely configure system controller 106. For example, the CDP 131 may provide the user an opportunity to configure system controller 106 with a large general purpose computer screen and greater number of interface features than may be available on a user interface of system controller 106, in some cases, allowing the interface of system controller 106 to be smaller and/or eliminated entirely.

System controller 106 may also be configured to communicate with other Internet sites 129. Such other Internet sites 129 may receive and/or distribute data regarding the location information. In some cases, other Internet sites 129 may provide a private and/or secured portal to information gathered as a function of and/or related to the location information and/or the request for the location information generated and/or transmitted by the HVAC system 100. In some cases, any of the HVAC systems 100, CDP 131, SP 133, other Internet sites 129, and/or other devices 130 may generate, transfer, receive, and/or present information and/or signals ultimately related to location information and/or a request for location information. As an example, the system controller 106 may automatically cause the location determination module 162 to determine and/or request determination of location information in response to first powering on the system controller 106. Alternatively, the system controller 106 may be provided with an interactive menu system that allows and/or prompts a user to operate the location determination module 162. In some cases, the CDP 131 and/or the SP 133 may take predetermined actions in response to receiving the location information and/or the request for location information from the system controller 106. For example, the CDP 131 may remotely initiate a change in an HVAC system 100 operational setting and/or operating parameters that are predetermined as appropriate for the location information reported to the CDP 131. Furthermore, acceptable operating temperatures and pressures of the HVAC system 100 may be adjusted for the climate in which the HVAC system 100 is reported as being located. The HVAC system 100 may also send warnings and/or operational fault conditions to the CDP 131. Such warnings and/or operational faults may thereafter aggregate, and the CDP 131 may statistically analyze the information as a function of the location information for each reported HVAC system 100 to determine and/or manage equipment failure statistics that the impact location may statistically have on a lifespan and/or operation of a particular HVAC system 100 and/or HVAC system 100 component.

Additionally, in cases where the HVAC systems 100 are configured to report system failures and/or needs for service repair calls to the CDP 131, the CDP 131 may utilize the location information of the HVAC systems 100 to more efficiently route and/or direct repair technicians in an effort to provide quicker response times and/or to reduce fuel consumption attributable to unnecessary travel. Still further, in cases where the location information is reported to the CDP 131 and/or the SP 133, a substantial change in location may serve as an indication to the CDP 131 and/or the SP 133 that the system controller 106 and/or an HVAC system 100 component having a location determination module 162 has been stolen and relocated which may prompt notification of law enforcement. While the location determination module 162 is described above as utilizing GPS technology, in alternative embodiments, a location determination module 162 may instead and/or additionally utilize LAN, WAN, 3G, 4G, and/or any other type of network infrastructure to assist in determining a location of the HVAC system.

Referring now to FIG. 3, a flowchart of a method 300 of operating an HVAC system such as HVAC system 100 is shown. The method 300 may begin at block 302 by providing an HVAC system controller such as system controller 106 comprising a location determination module such as location determination module 162. In some embodiments, the system controller provided may comprise a wall mountable thermostat comprising a location determination module such as location determination module 162. The method 300 may continue at block 304 by operating the HVAC system controller to determine a location of the HVAC system in response to at least one of a first powering up of the HVAC system and an instruction from a user or a remote manager to determine a location of the HVAC system. The method 300 may continue at block 306 by adjusting an operational setting of the HVAC system in response to the determined location of the HVAC system location.

Referring now to FIG. 4, a flowchart of a method 400 of operating an HVAC system such as HVAC system 100 is shown. The method 400 may begin at block 402 by providing an HVAC system comprising a location determination module such as, but not limited to, location determination module 162. The method 400 may continue at block 404 by operating the HVAC system to operate the location determination module to determine a location of the HVAC system and/or report a determined location of the HVAC to a remote system, such as, but not limited to, another HVAC system, CDP 131, SP 133, other Internet site 129, and/or other devices 130.

FIG. 5 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
   a system controller comprising:
      a location determination module configured to automatically determine the location of the HVAC system in response to initialization of power to the system controller.

2. The HVAC system of claim 1, wherein the location determination module is carried by the system controller of the HVAC system.

3. The HVAC system of claim 1, wherein the location determination module is configured to generate latitude and longitude location.

4. The HVAC system of claim 1, wherein the location determination module is configured to request generation of a location of the HVAC system.

5. The HVAC system of claim 1, wherein the location determination module is configured to transmit location information.

6. The HVAC system of claim 1, wherein the system controller of the HVAC system is configured to selectively communicate information regarding a location of the HVAC system to a home automation provider.

7. The HVAC system of claim 1, wherein the system controller of the HVAC system is configured to selectively communicate information regarding a location of the HVAC system to a security provider.

8. The HVAC system of claim 1, wherein the system controller of the HVAC system is configured to selectively communicate information regarding the location of the HVAC system to a second HVAC system.

9. The HVAC system of claim 1, wherein the location determination module is configured to determine location information in response to initialization of the HVAC system.

10. The HVAC system of claim 1, wherein the location determination model comprises at least one of a global positioning system device and a cellular telecommunication device.

11. A method of operating an HVAC system, comprising:
providing an HVAC system comprising a system controller comprising a location determination module;
initializing power to the system controller;
determining location information of the HVAC system automatically in response to initializing power to the system controller; and
communicating location information to a remote system.

12. The method of claim 11, wherein the determining location information of the HVAC system is accomplished in response to the first operation of the HVAC system.

13. The method of claim 11, wherein the location determination module is carried by a system controller of the HVAC system.

14. The method of claim 13, wherein the determining location information of the HVAC system is accomplished in response to an instruction being received by the system controller.

15. The method of claim 11, wherein the determining location information of the HVAC system is accomplished by generating latitude and longitude coordinates.

16. The method of claim 11, wherein the remote system comprises a home automation provider.

17. The method of claim 11, wherein the remote system is a security provider.

18. The method of claim 11, wherein the remote system is a second HVAC system.

19. The method of claim 11, wherein the remote system comprises a smartphone.

20. The method of claim 11, wherein in response to the remote system receiving the location information, the system controller changes an operational parameter of the HVAC system selected as a function of the location of the HVAC system.

* * * * *